United States Patent
Ques et al.

(10) Patent No.: US 7,305,087 B1
(45) Date of Patent: Dec. 4, 2007

(54) DIGITAL HOME NETWORK AND METHOD FOR CREATING AND UPDATING SUCH A NETWORK

(75) Inventors: Florence Ques, Marseilles (FR); Jean-Pierre Andreaux, Rennes (FR); Teddy Furon, Rennes (FR)

(73) Assignee: Thomson Licensing, Boulogne (FR)

( * ) Notice: Subject to any disclaimer, the term of this patent is extended or adjusted under 35 U.S.C. 154(b) by 0 days.

(21) Appl. No.: 09/958,733

(22) PCT Filed: Mar. 31, 2000

(86) PCT No.: PCT/EP00/02918

§ 371 (c)(1),
(2), (4) Date: Jan. 16, 2002

(87) PCT Pub. No.: WO00/62505

PCT Pub. Date: Oct. 19, 2000

(30) Foreign Application Priority Data

Apr. 13, 1999 (FR) .................................. 99 04767

(51) Int. Cl.
*H04N 1/44* (2006.01)
*H04N 7/16* (2006.01)
*H04N 1/64* (2006.01)

(52) U.S. Cl. ........................ 380/207; 380/229; 380/201

(58) Field of Classification Search ................ 713/171, 713/201; 380/201, 207, 229
See application file for complete search history.

(56) References Cited

U.S. PATENT DOCUMENTS 5,870,474 A * 2/1999 Wasilewski et al. ......... 380/211
6,240,514 B1 * 5/2001 Inoue et al. ................. 713/153
6,263,437 B1 * 7/2001 Liao et al. .................... 713/169

FOREIGN PATENT DOCUMENTS

EP 0382296 8/1990
EP 0679029 10/1995

* cited by examiner

*Primary Examiner*—Gilberto Barron
*Assistant Examiner*—Venkat Perungavoor
(74) *Attorney, Agent, or Firm*—Joseph J. Laks; Robert D. Shedd; Paul P. Kiel

(57) ABSTRACT

The local digital network comprises: access devices, for receiving data originating from outside the network and transmitting them at a point of the network; and presentation devices for receiving the data flowing in the network and presenting them at a point of the network. The data flow in the network in encrypted form and all the devices of the network use a single key, the local key of the network, for the encryption and decryption of the data. Preferably, the local key of the network is formed by a pair of public and private keys. The purpose of this network is to make it possible to copy data in the local network whilst preventing pirate copies destined for other local networks.

16 Claims, 3 Drawing Sheets

DIGITAL HOME NETWORK AND METHOD FOR CREATING AND UPDATING SUCH A NETWORK

This application claims the benefit of French application serial no. 9904767 filed Apr. 13, 1999, which is hereby incorporated herein by reference, and which claims the benefit under 35 U.S.C. § 365 of International Application PCT/EP00/02918, filed Mar. 31, 2000, which was published in accordance with PCT Article 21(2) on Oct. 19, 2000 in English.

The present invention relates generally to the field of local digital networks and more particularly to the field of digital home networks.

Such a network consists of a set of devices interlinked by a digital bus, for example a bus according to the IEEE 1394 standard. It comprises two main types of devices:

access devices capable of receiving data originating from outside the local network and of transmitting them at a point of the network to which the devices are connected, and presentation devices, adapted to receive the data flowing in the network so as to present them at another point of the network to which these devices are connected. This second type of device has no link with the outside of the local network.

Thus, if one takes the example of a digital home network intended for conveying audio and/or video data into various rooms of a house, the access devices are for example digital decoders or set-top boxes receiving video programmes from outside the network, via a satellite antenna or via a cable connection, or else readers of optical disks broadcasting on the network, in digital form, data (audio and/or video) read from a disk (in this case the disk contains data originating from outside the network). The presentation devices are for example television receivers making it possible to view video programmes received from the network or, more generally, any type of apparatus capable of converting digital information received into an analogue signal so as to broadcast this signal to an end user.

A home network of the type mentioned hereinabove can also comprise a third type of device having no link with the outside of the network and having the function of recording the data flowing in the network. By way of example of apparatuses of this third type, mention may in particular be made of digital video recorders or apparatuses capable of recording optical disks, of the DVD type (the abbreviation "DVD" standing for "Digital Versatile Disk").

It should be noted that one and the same apparatus can belong to two, or even three different categories of devices mentioned hereinabove. For example, an apparatus for recording optical disks can also be capable of reading commercial prerecorded disks and thus of belonging at the same time to the first and to the third categories of devices mentioned above.

If one considers the viewpoint of the content providers who provide the data originating from outside the local network, especially providers of services broadcasting pay-televised programmes or else publishers of optical disks for example, it is necessary to prevent these transmitted data from being copied and from being able to flow easily (for example by being copied onto an optical disk or any other recording medium) from one local network to the other.

To do this, it is known practice to transmit the data in secret form by encrypting them with the aid of cryptography algorithms using keys which are known beforehand to the devices authorized to receive these data or else which are exchanged according to particular secure protocols between the content provider and these devices.

If one now considers the viewpoint of a user who possesses a digital home network, it is desirable for these data to be able to be transmitted to all the other devices of the network when one of the devices of the network is authorized to receive data from a content provider. Thus, a user who is a subscriber to a pay-television service and receives programmes (transmitted in encrypted form) on a set-top box located in his lounge (authorized to decrypt them), will wish to be able to watch these programmes for example on a television located in his bedroom. Moreover, the user is interested in recording programmes received and in being able subsequently to view them on several devices of the network even when he no longer subscribes to the pay-television service.

To take into account the wishes of content providers and also of users, it is an object of the invention to provide a means such that data received by a local digital network can flow freely between the various devices of the network whilst preventing them from flowing from one local network to another.

To this end, the invention proposes a local digital network, in particular a digital home network, comprising at least one access device, capable of receiving data originating from outside the network and of transmitting them at a point of the network; and at least one presentation device, adapted to receive data flowing in the network so as to present them at a point of the network; in which the data are adapted to flow only in encrypted form. According to the invention, all the devices of the network use for the encryption and decryption of the data flowing in the network a single encryption key specific to the network: the local key of the network.

Since each local network possesses its own local key which is different from that of the other local networks, any information which enters the said network will be readable equally by all the devices of the network but will not be copiable for being read onto another local network. More exactly, the information will be copiable, in its encrypted form, but it will not be possible to replay it in a local network different from that to which it was copied. Thus, the invention meets the wishes of content providers and also of users.

According to a preferred aspect of the invention, the data are encrypted using a cryptographic system with public keys, also known as asymmetric cryptographic system. The local key of the network is in this case formed by a pair of public and private keys: the local public key and the local private key of the network.

Preferably, only the presentation devices connected to the network know the local private key.

According to a particular embodiment, at a given instant, a single presentation device of the network is authorized to transmit the local private key to a new presentation device apt to be connected to the network. This device will subsequently be referred to as the genitor of the network.

Thus, if this genitor is removed from the local network, especially to create a pirate local network possessing the same local key as the initial local network, the latter will no longer be able to alter since no device of the initial network will any longer be capable of transmitting the local private key of the network to a new presentation device apt to be connected to the initial local network.

According to another aspect of the invention, at a given instant, a presentation device can be in only one of the following states:

i) a first state, the virgin state, when the presentation device is connected for the first time to the network;

ii) a second state, the genitor state, in which the presentation device is authorized to transmit the local private key of the network to any new presentation device apt to be connected to the network;

iii) a third state, the sterile state, in which the presentation device is no longer authorized to transmit the local private key of the network to any new presentation device apt to be connected to the said network.

A presentation device can change state only so as to pass to a state of higher rank, that is to say from the virgin state to the genitor state or from the genitor state to the sterile state, or else from the virgin state to the sterile state.

According to a preferred aspect of the invention, a single presentation device of the network is in the second state, the genitor state: the genitor of the network.

According to a particular embodiment, at a given instant, the genitor of the network is the presentation device which was connected last to the network.

Thus, the title of "genitor" of the network is transmitted to each new apparatus connected to the local network. This prevents a pirate from being able, starting from a single genitor presentation device, to create in series local networks all having the same local keys.

The invention also relates to a presentation device adapted to be connected to a digital network such as described hereinabove and which, at a given instant, can be in only one of the states which were mentioned above, namely: the virgin state, the genitor state or the sterile state, the said presentation device being adapted to change state only so as to go to a state of higher rank.

According to one aspect of the invention, when the presentation device is in the virgin state, it possesses its own pair of public and private keys and it is authorized to receive the pair of local keys of a network to which it is apt to be connected so as to store them instead of its own pair of keys.

According to another aspect of the invention, when the presentation device is in the sterile state, it is no longer authorized to receive the pair of local keys of a network to which it is apt to be connected.

According to another aspect of the invention, the presentation device comprises a means for storing the state which said presentation device occupies, this storage means being integrated into a smart card.

According to yet another aspect of the invention, the pair of local keys of the network is contained in a smart card with which said device is furnished.

The invention also relates to a process for creating and for updating a network such as hereinabove, which will be described subsequently.

Other characteristics and advantages of the invention will become apparent on reading the following description of a particular, nonlimiting embodiment of the invention, given with reference to the appended drawings in which.

In the figures, only the elements which are vital to the understanding of the invention and of the particular embodiment which will be described have been represented.

Figure 1:
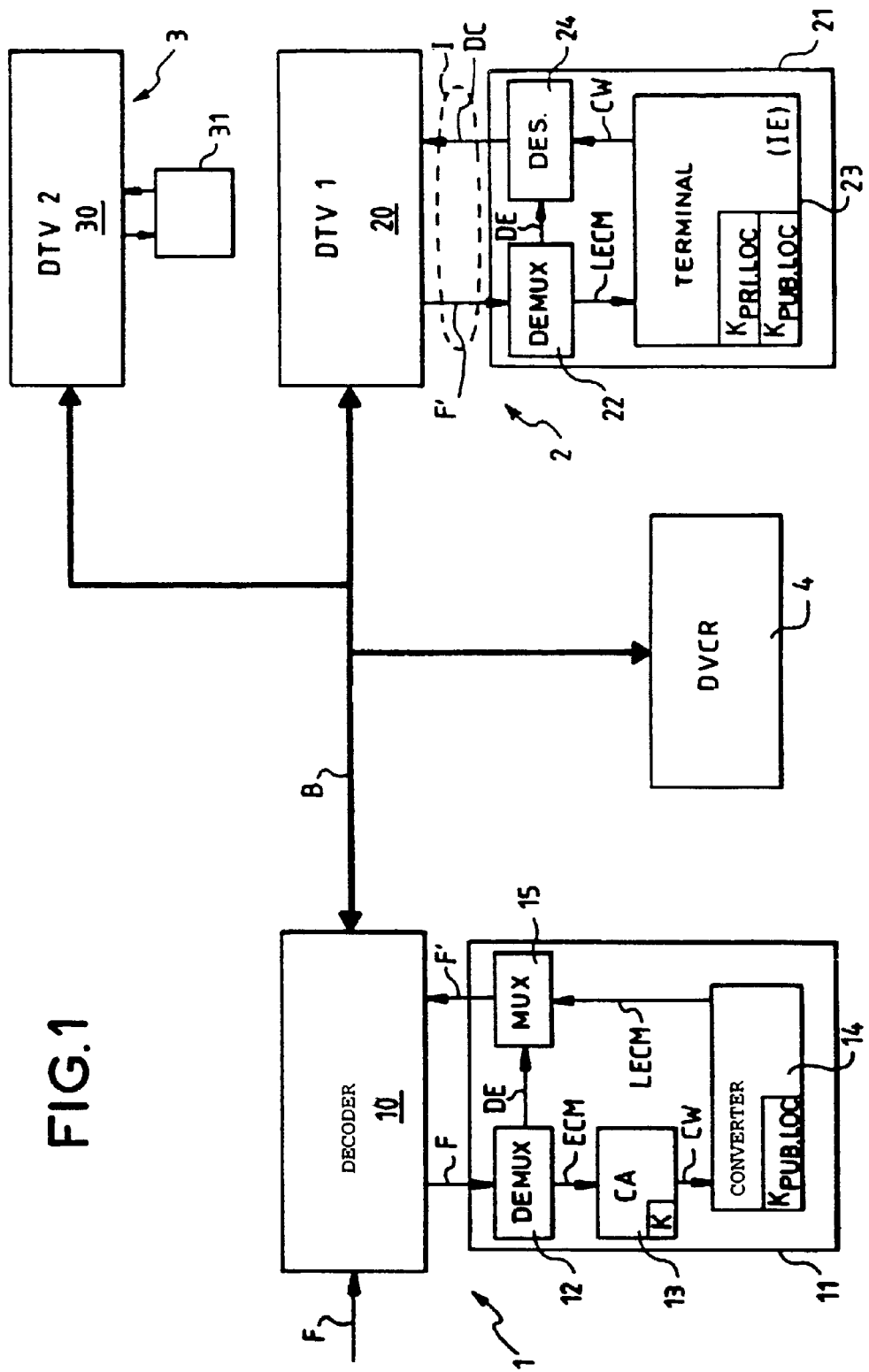
FIG. 1 represents a local digital network according to the invention.

Represented in FIG. 1 is a digital home network comprising an access device 1, two presentation devices 2 and 3 as well as a digital video recorder 4, commonly referred to as a DVCR (the abbreviation DVCR standing for "Digital Video Cassette Recorder"). The assembly of devices 1, 2, 3 and 4 is connected to a domestic digital bus B which is for example a bus according to the IEEE 1394 standard.

The access device 1 comprises a digital decoder 10 equipped with a smart card reader furnished with a smart card 11. This digital decoder 10 is connected, either to a satellite antenna, or to a cable network, so as to receive video programmes distributed by a service provider. These programmes are received in a stream F of data for example in the MPEG-2 format. In a manner known per se, they are transmitted in scrambled form, the content being scrambled by control words CW. These control words are themselves transmitted, in the data stream F, in a form encrypted using a key K according to a given enciphering algorithm in such a way as to remain secret during transmission.

Thus, only the users authorized by the service provider are empowered to descramble the data transmitted (against payment of a subscription for example). To do this, the provider supplies the authorized users with the key K serving to decrypt the control words CW. Very often, authorization to receive the programmes is only temporary, so long as the user pays his subscription. The key K is therefore modified regularly by the service provider.

By virtue of the invention, and as will be seen hereinbelow, the user will nevertheless be able to record programmes transmitted while he is subscribing and to replay them as often as he wishes on his own network, even if he is no longer a subscriber. On the other hand, since the data are recorded in scrambled form, it will only be possible to replay them on the network of the user who recorded them.

In FIG. 1, the network is represented in the state which it occupies when all the apparatuses have been connected according to the processes which will be described subsequently in conjunction with FIGS. 2 and 3.

We shall now describe how the data which are transmitted in the stream F received by the decoder 10 are processed. As is known to the person skilled in the art, in the case of data transmitted according to the MPEG-2 format, the data stream F comprises a succession of video data packets, of audio data packets and of management data packets. The management data packets comprise in particular control messages denoted ECM (the abbreviation "ECM" standing for "Entitlement Control Message") in which are transmitted, in a form encrypted using a key K, the control words CW which served to scramble the data transmitted in the video and audio data packets.

This data stream F is transmitted to the smart card 11 so as to be processed therein. It is received by a demultiplexer circuit (DEMUX) 12, which circuit transmits, on the one hand to an access control circuit (CA) 13 the ECMs and, on the other hand, to a multiplexing circuit (MUX) 15 the packets, denoted DE, of scrambled video and audio data. The circuit CA contains the key K and can thus decrypt the control words CW which are contained in the ECMs. The circuit CA transmits these control words CW to a converter circuit 14 which contains, according to the invention, the local public key of the network $K_{PUB\_LOC}$. The converter 14 uses the key $K_{PUB\_LOC}$ to encrypt the control words CW and transmits these control words, encrypted using the local public key, to the multiplexing circuit 15 in control messages denoted LECM. These messages LECM have the same function as the messages ECM received in the initial data stream F, namely of transmitting the control words CW, but in the messages LECM, the control words CW are encrypted therein using the local public key $K_{PUB\_LOC}$ instead of being encrypted using the key K of the service provider.

The multiplexing circuit 15 then transmits the data packets DE and the converted control messages LECM in a data stream F' which is received by the decoder 10. It is this data stream F' which will then flow around the domestic bus B so as to be received, either by one of the presentation devices 2 or 3, or by the digital video recorder 4 so as to be recorded. According to the invention, the data therefore always flow in encrypted form in the bus B, and only the apparatus containing the private local key $K_{PRI.LOC}$ of the network are capable of decrypting the control words CW and hence of decrypting the data DE. This therefore prevents the broadcasting to other local networks of any copy made in the domestic network of FIG. 1.

In the example of FIG. 1, the circuits 12 to 15 are integrated into the smart card 11 but in a variant embodiment, it is possible to place the circuits DEMUX and MUX in the decoder 10, only the circuits 13 and 14 remaining integrated into the smart card. Specifically, since the circuit CA 13 and the converter 14 contain decryption and encryption keys, they must be integrated into a secure medium such as a smart card.

The presentation device 2 comprises a digital television receiver (DTV1) 20 equipped with a smart card reader furnished with a smart card 21. The receiver 20 receives the data stream F' originating, either from the decoder 10, or from the digital video recorder 4, through the bus B. The data stream F' is transmitted to the smart card 21. It is received by a demultiplexer circuit (DEMUX) 22, which transmits, on the one hand the scrambled video and audio data packets DE to a descrambling circuit (DES.) 24, and on the other hand the converted control messages LECM to a terminal module 23. The terminal module contains the pair of public ($K_{PUB.LOC}$) and private ($K_{PRI.LOC}$) keys of the network. Since the control messages LECM contain the control words CW which have been encrypted using the local public key $K_{PUB.LOC}$ of the network, the terminal module can decrypt these control words using the local private key $K_{PRI.LOC}$ so as to obtain the control words CW in clear. These control words CW are then transmitted to the descrambling circuit 24 which uses them to descramble the data packets DE and to output clear data packets DC to the television receiver 20.

In order to secure the transmission lastly of the clear data DC between the smart card 21 and the display circuits of the television receiver 20, the interface I between said smart card and the card reader of the receiver 20 is for example made secure according to the American NRSS standard (NRSS being the acronym for National Renewable Security Standard) for securing smart cards.

The second presentation device 3, comprising a digital television receiver (DTV2) 30 equipped with a smart card reader furnished with a smart card 31 operates in exactly the same way as the presentation device 2 and will not be described further.

By virtue of the local digital network just described, the data stream F originating from a content provider is transformed by the access device which receives it into a data stream F' by virtue of the local public key of the network $K_{PUB.LOC}$. This data stream F' thus contains data having a format specific to the local network, which data cannot be decrypted other than by the presentation devices of the local network which all contain the local private key of the network.

We shall now describe how the local digital network of FIG. 1 is created and how the connecting of new apparatuses to the said network is managed so as to guarantee that all the apparatuses of the network all share the unique local pair of keys of the network.

Figure 2:
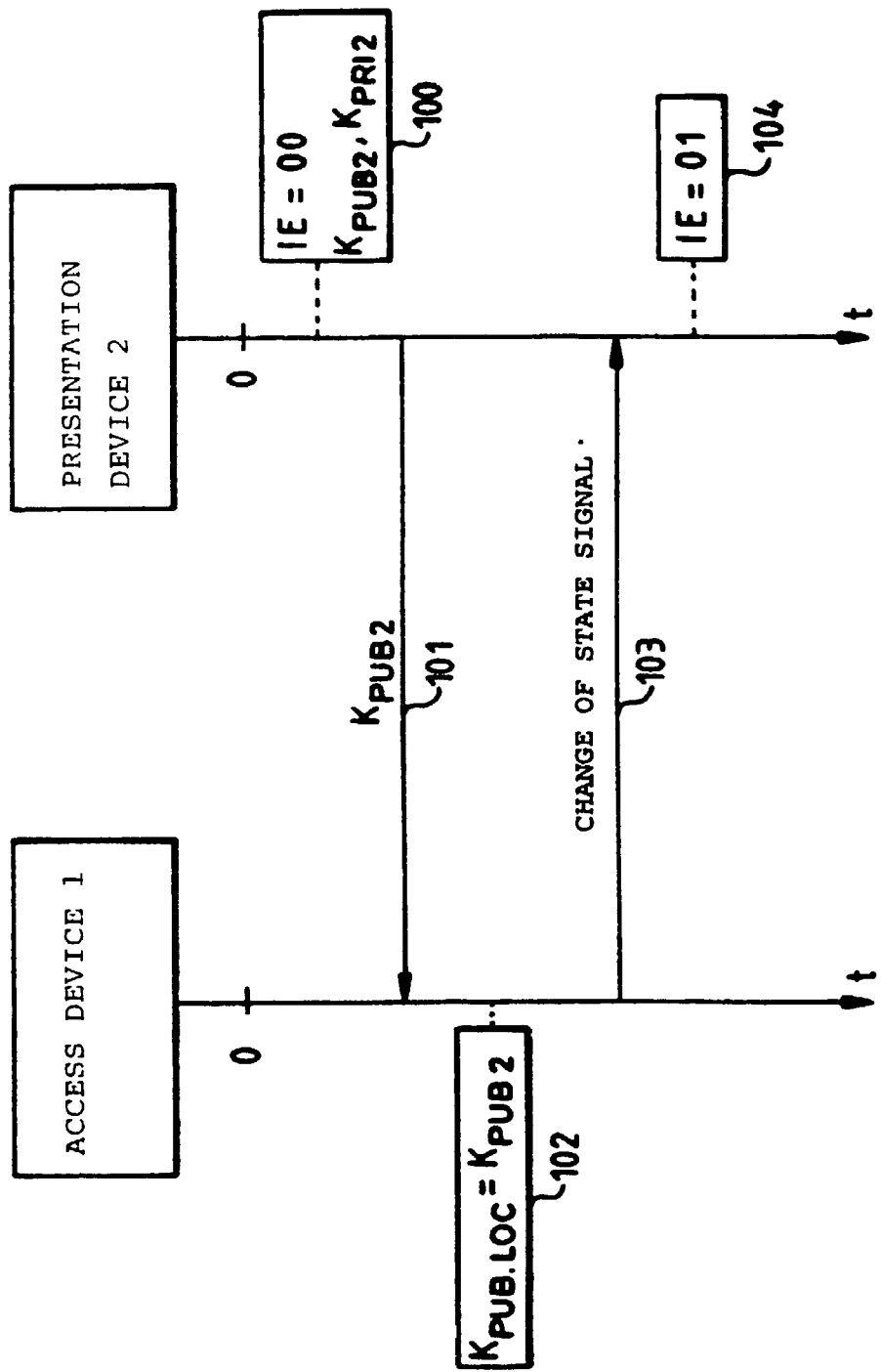
FIG. 2 illustrates a process for creating a digital network such as that of FIG. 1.
Figure 3:
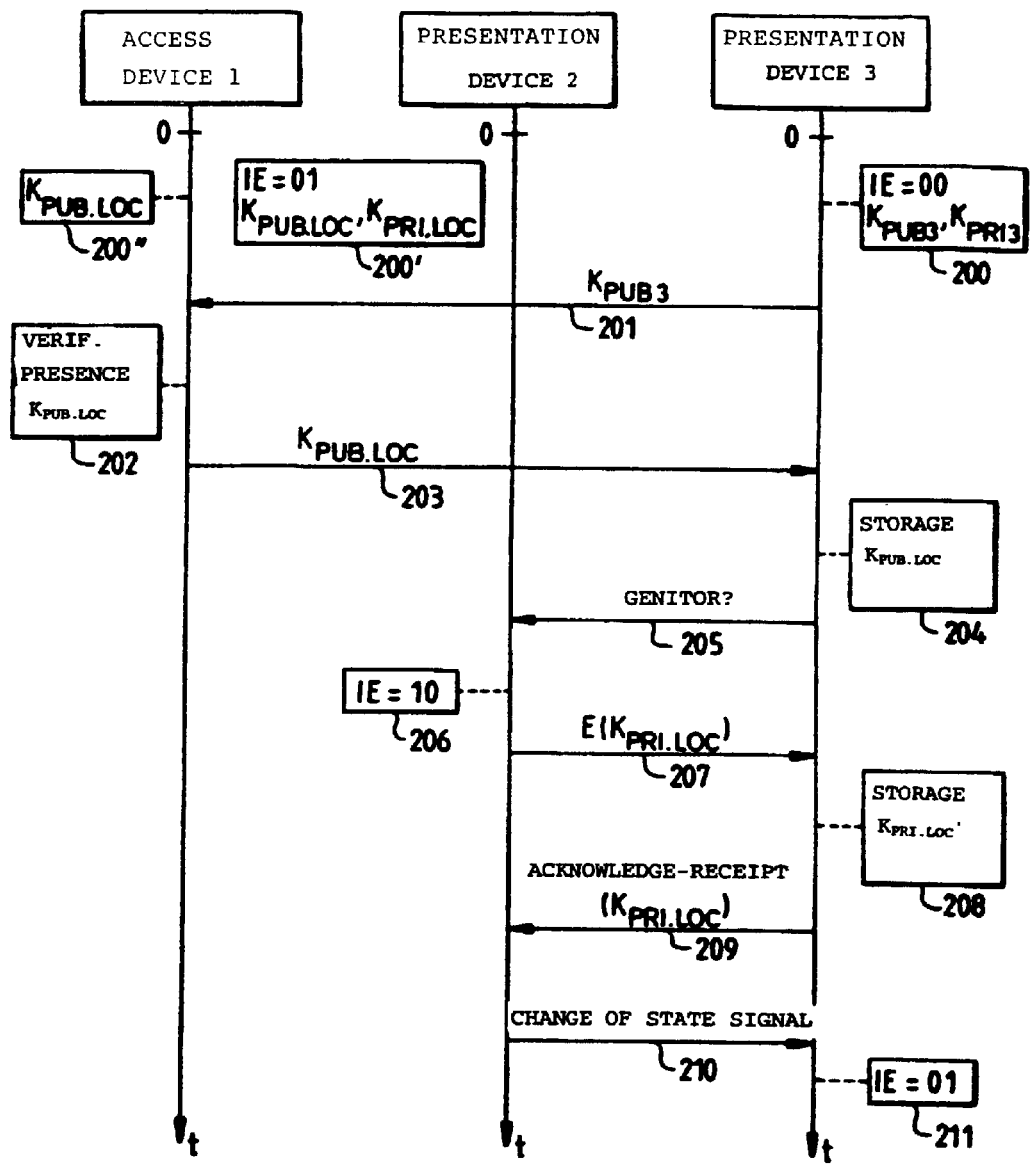
FIG. 3 illustrates a process for connecting a new presentation device to a local digital network created according to the process of FIG. 2 for example.

In FIG. 2, the process for creating the digital network represented in FIG. 1 is illustrated diagrammatically.

To create a digital network according to the invention, it is necessary to connect together an access device and a presentation device.

In FIG. 2, it is assumed that at the outset the network is created by connecting the access device 1 and the presentation device 2 by way of the digital bus B.

The various steps of the process for creating the network have been represented along a time axis t which is doubled up in such a way as to illustrate the exchanges which take place between the two devices.

In the first step 100 of the process, when the two devices are connected together, the presentation device contains a pair of public $K_{PUB2}$ and private $K_{PRI2}$ keys and is, according to the invention, in the virgin state.

The state of the device is stored preferably by a state indicator IE which is a 2-bit register located in the terminal module 23 (FIG. 1) of the presentation device. By convention, it is assumed that when the device is in the virgin state, the state indicator IE is equal to 00; when the device is in the genitor state, IE=01 and when the device is in the sterile state, IE=10.

The state indicator IE is contained in an integrated circuit in a smart card so as to guarantee that it is tamper-proof.

When a presentation device is sold by a manufacturer, it must be able to be connected to any existing local digital network, of the type of the invention. It must also be capable of being connected to an access device so as to create a new network. This is why any presentation device which is manufactured according to the invention routinely comprises a pair of public and private keys, this pair of keys being unique and different from one device to another, so as to guarantee the fact that each local network created according to the invention also possesses a unique pair of keys. Moreover, to guarantee the security of the exchanges, all the pairs of private/public keys used are certified according to a method known to the person skilled in the art.

The access devices, on the other hand, are manufactured and sold without containing any encryption/decryption key. They nevertheless preferably contain a converter circuit (contained in a smart card) according to the invention and such as described previously in conjunction with FIG. 1, which is capable of storing a local key of a network to which they are apt to be connected.

Referring again to FIG. 2, step 101 of the process consists, for the presentation device 2, in dispatching over the bus B its public key $K_{PUB2}$ destined for all the access devices apt to be connected to the bus B, in this instance the access device 1.

Step 102 consists, for the access device 1, in receiving the public key $K_{PUB2}$ and in storing it as the new local public key of the network ($K_{PUB.LOC}=K_{PUB2}$).

In step 103, the access device 1 dispatches over the bus B a change of state signal destined for the presentation device 2. This step has the objective of indicating to the presentation device 2 that it is the first to be connected to the network and that it must therefore become the genitor of the network, that is to say the only presentation device authorized to transmit its private key $K_{PRI2}$ (which becomes the local private key of the network $K_{PRI.LOC}$) to any new presentation device apt to be connected to the network.

Step 104 therefore consists, for the presentation device 2, in receiving the change of state signal and modifying its state indicator so as to pass to the genitor state (IE=01).

At the end of the process, one therefore has a local digital network in accordance with the invention which comprises a unique local public key $K_{PUB.LOC}$ (equal to the initial public key $K_{PUB2}$ of the presentation device 2) which is known to both devices of the network, and a unique local private key $K_{PRI.LOC}$ which is known only to the presentation device 2. The network also comprises, in accordance with the invention, a genitor presentation device which is capable of altering it by allowing the connection of new presentation devices.

The process for connecting a new presentation device, in this instance the presentation device 3, to the network created in accordance with the process of FIG. 2, will now be described in conjunction with FIG. 3.

In the first step 200, 200' 200" of the process, which consists in connecting the presentation device 3 to the existing local network by way of the digital bus B, the presentation device 3 contains its own pair of public $K_{PUB3}$ and private $K_{PRI3}$ keys and it is in the virgin state (IE=00). The access device 1 and presentation device 2 are respectively in the same state as at the end of the process of FIG. 2, that is to say the access device 1 contains the local public key of the network $K_{PUB.LOC}$ and the presentation device is the genitor of the network (IE=01) and contains the pair of local keys ($K_{PUB.LOC}$, $K_{PRI.LOC}$) of the network.

The second step 201 consists, for the presentation device 3, in dispatching over the bus B its public key $K_{PUB3}$ destined for all the access devices apt to be connected to the bus B, in this instance the access device 1. This step is the same as step 101 (FIG. 2) of the creation process.

Step 202 consists, for the access device 1, in receiving the public key $K_{PUB3}$ and in verifying whether it already contains a public key or not (VERIF. PRESENCE $K_{PUB.LOC}$).

In the event of a positive verification, this being the case in this instance, the next step 203 consists, for the access device 1, in dispatching the local public key $K_{PUB.LOC}$ over the bus B destined for the new presentation device 3.

In step 204, the presentation device 3 receives the local public key $K_{PUB.LOC}$ and stores it, preferably in its terminal module.

The next step 205 consists, for the presentation device 3, in dispatching a signal over the bus B, addressed to all the presentation devices of the network, in the form of a message (GENITOR?) requesting the genitor device of the network to respond to it.

In step 206, the genitor device of the network, in this instance the presentation device 2, receives this message and, once the communication has been established in a dependable manner between the presentation devices 2 and 3, it changes state so as to pass to the sterile state (IE=10).

Step 207 then consists, for the presentation device 2, in dispatching the local private key of the network in encrypted form ($E(K_{PRI.LOC})$) which can be decrypted by the presentation device 3. In particular, this secure transmission of the local private key between the presentation devices 2 and 3 can be performed using the initial public key $K_{PUB3}$ of the presentation device 3 to encrypt the local private key, the presentation device 3 being capable of decrypting this message using its private key $K_{PRI3}$. The key $K_{PUB3}$ is for example transmitted to the presentation device 2 during step 205.

In step 208, the presentation device 3 receives and decrypts the local private key and stores it, preferably in its terminal module, integrated into the smart card 31 (FIG. 1).

Step 209 consists, for the presentation device 3, in dispatching a signal acknowledging receipt of the local private key (ACKNOWLEDGE-RECEIPT ($K_{PRI.LOC}$)) over the bus B destined for the presentation device 2.

In step 210, the presentation device 2 receives this acknowledgement of receipt signal and dispatches, in response, a change of state signal to the new presentation device 3 and in step 211, the presentation device 3 receives this signal and changes state so as to become the new genitor of the network (IE=01).

Since the presentation device 2 is henceforth in the sterile state, it is no longer authorized to transmit the local public key of the network to another presentation device. This makes it possible to prevent this device 2 from being removed from the network so as to create another pirate local network possessing the same pair of local keys as the network just described.

At the end of the process, there are therefore two presentation devices 2 and 3 and one access device 1 which are connected to the local network. They all share the local key pair of the network $K_{PUB.LOC}$, $K_{PRI.LOC}$. There is always a unique genitor in the network which is the presentation device which was connected last to the network.

The connecting of a new access device to the local network is for its part much simpler since any access device in accordance with the invention is sold without containing a key. It is in particular possible to envisage that when a new access device is plugged into the network, it dispatches a message over the bus B requesting to receive the public key of the network. It is then possible to make provision for either the first network device which receives this message, or only the genitor device, to dispatch, in response to this message, the public key of the network to the new access device.

The invention claimed is:

1. Local digital network, in particular digital home network, comprising:
    at least one access device, capable of receiving data originating from outside said network and of transmitting them at a point of said network; and
    at least one presentation device, adapted to receive data flowing in the network so as to present them at a point of the network;
    in which the data are adapted to flow only in encrypted form between the access device and the presentation devices of the local network, all the devices of said network using for the encryption and decryption of the data flowing in the network a single encryption key specific to the network: the local key of the network,
    in which the data are encrypted using a public keys cryptographic system, wherein said local key of the network is formed by a pair of public and private keys: the local public key and the local private key of the network,
    wherein only the presentation devices connected to the said network contain the local private key,
    wherein at a given instant, a single presentation device of the network is authorized to transmit the local private key to a new presentation device apt to be connected to said network, and
    wherein at a given instant, a presentation device can be in only one of the following states:
    i) a first state, the virgin state, when the presentation device is connected for the first time to said network:
    ii) a second state, the genitor state, in which the presentation device is authorized to transmit the local private key of the network to any new presentation device apt to be connected to said network;

iii) a third state, the sterile state, in which the presentation device is no longer authorized to transmit the local private key of the network to any new presentation device apt to be connected to the said network, a presentation device being adapted to change state only so as to pass to a state of higher rank.

2. Digital network according to claim 1, wherein a single presentation device of the network is in the second state, the genitor state: the genitor of the network.

3. Digital network according to claim 2, wherein at a given instant, the genitor of the network is the presentation device which was connected last to the said network.

4. Presentation device adapted to be connected to a local digital network, in particular digital home network, comprising: at least one access device, capable of receiving data originating from outside said network and of transmitting them at a point of said network; and at least one presentation device, adapted to receive data flowing in the network so as to present them at a point of the network, in which the data are adapted to flow only in encrypted form between the access device and the presentation devices of the local network, all the devices of said network using for the encryption and decryption of the data flowing in the network a single encryption key specific to the network: the local key of the network, in which the data are encrypted using a public keys cryptographic system, wherein said local key of the network is formed by a pair of public and private keys: the local public key and the local private key of the network, wherein at a given instant, said presentation device can be in only one of the following states:

i) a first state, the virgin state, when the presentation device is connected for the first time to a network;

ii) a second state, the genitor state, in which the presentation device is authorized to transmit the local private key of the network to any new presentation device apt to be connected to said network;

iii) a third state, the sterile state, in which the presentation device is no longer authorized to transmit the local private key of the network to any new presentation device apt to be connected to said network, said presentation device being adapted to change state only so as to pass to a state of higher rank.

5. Presentation device according to claim 4, wherein when said presentation device is in the virgin state, it contains its own pair of public and private keys and it is authorized to receive the pair of local keys of a network to which it is apt to be connected so as to store them instead of its own pair of keys.

6. Presentation device according to claim 4, wherein when said presentation device is in the sterile state, it is no longer authorized to receive the pair of local keys of a network to which it is apt to be connected.

7. Presentation device according to claim 4, wherein it comprises a means for storing the state which said presentation device occupies, this storage means being integrated into a smart card.

8. Presentation device according to claim 4, wherein the pair of local keys of the network is contained in a smart card with which said device is furnished.

9. Process for creating a local digital network according to claim 1, comprising the steps of:

a) in connecting together by way of a digital bus an access device and a presentation device in the virgin state and containing a pair of public and private keys;

b) dispatching by the presentation device, over said bus its public key;

c) dispatching by the access device, said public key, in storing it as a new local public key of the network and dispatching over said bus a signal of change of state of the presentation device:

d) receiving by the presentation device, said change of state signal and in passing to the genitor state.

10. Process for connecting a new presentation device in the virgin state and containing a pair of public and private keys to a local digital network according to claim 1, comprising the steps of:

e) connecting the new presentation device to the said local network by way of a digital bus;

f) for the new presentation device, dispatching over said bus its public key;

g) for at least one of the access devices of said network, receiving the public key of the new presentation device, verifying that said access device already contains a public key, the local public key of the network, and, in the event of a positive verification, dispatching over the bus the local public key of the network;

h) for the new presentation device, receiving the local public key of the network, storing it and dispatching over said bus a signal, addressed to all the presentation devices of the network, requesting response from the presentation device in the genitor state;

i) for the genitor presentation device of the network, receiving said response request signal, passing to the sterile state, and dispatching in response to the new presentation device the local private key of the network in an encrypted form which can be decrypted by the new presentation device;

j) for the new presentation device, receiving said local private key of the network, storing it and dispatching an acknowledgement of receipt signal to the presentation device which was formerly the genitor of the network;

k) for the presentation device which was formerly the genitor of the network, receiving said acknowledgement of receipt signal and dispatching to the new presentation device a change of state signal;

l) for the new presentation device, receiving said change of state signal and passing to the genitor state.

11. Presentation device adapted to be connected to a local digital network for receiving data flowing in the network, said data being encrypted in an access device connected to the network, comprising:

a receiver coupled to the local digital network for receiving the encrypted data, and a memory having a state indicator indicating a state of the presentation device relating to whether said presentation device contains a decryption key specific to the network for decrypting the received data and whether said presentation device is authorized to transmit the decryption key to any new presentation device apt to be connected to the network wherein in a first state of the presentation device, the virgin state, the presentation device is connected for the first time to a network and does not contain the decryption key specific to the network.

12. Presentation device according to claim 11, wherein in a second state of the presentation device, the genitor state, the presentation device contains the decryption key specific to the network and is authorized to transmit said decryption key to any new presentation device apt to be connected to the network.

13. Presentation device according to claim 12, wherein in a third state of the presentation device, the sterile state, the presentation device contains the decryption key specific to the network and is not authorized to transmit said decryption key to any new presentation device apt to be connected to the network.

14. Presentation device according to claim 13, wherein said device is adapted to change state only so as to pass:

from the virgin state to the genitor state; or from the genitor state to the sterile state; or from the virgin state to the sterile state.

15. Presentation device according to claim 14, wherein if said device is in the genitor state then the presentation device is the only presentation device in the genitor state connected to the network.

16. Presentation device according to claim 11, wherein the state indicator is contained in a smart card able to be inserted in said presentation device.

* * * * *